United States Patent Office 3,205,253
Patented Sept. 7, 1965

3,205,253
N-(BETA-O-DIALKYLDITHIOPHOSPHORYL)-ARYL SULFONAMIDES
Llewellyn W. Fancher, Lafayette, Calif., and Chester L. Dewald, Houston, Tex., assignors to Stauffer Chemical Company, New York, N.Y., a corporation of Delaware
No Drawing. Filed May 28, 1963, Ser. No. 283,709
11 Claims. (Cl. 260—461)

This application is a continuation-in-part of U.S. Ser. No. 106,448, filed May 1, 1961, which is now abandoned.

This invention relates to certain new and novel chemical compounds and the use of such compounds as selective herbicides.

More specifically, the invention relates to compounds of the formula:

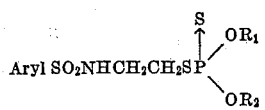

wherein $R_1$ and $R_2$ are lower alkyl radicals. The aryl group in the compounds of the present invention may be either a phenyl group or a substituted phenyl group.

These compounds are prepared by the following reaction:

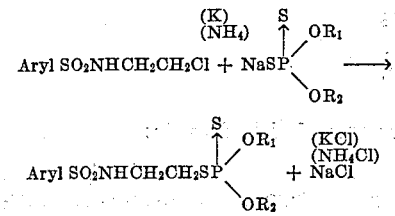

The beta-chloro intermediates only have been indicated in the above reaction merely for economic reasons. However, the beta-bromo and beta-iodo intermediates will also yield the equivalent phosphate derivatives.

The completeness of the above reaction is dependent upon the type of solvent used. In general, polar solvents are better than non-polar solvents and certain catalysts such as tertiary amines and dimethyl formamide aid in bringing the reaction to completion.

The following non-limiting examples illustrate the preparation of this class of compounds:

*Example 1.—N-(beta-O,O-diethyldithiophosphorylethyl)-benzene sulfonamide*

A mixture of 116 g. (0.53 M) of N-(beta-chloroethyl)-benzene sulfonamide, 162.4 g. (0.8 M) of ammonium-diethyldithiophosphate and 250 ml. of methyl ethyl ketone was stirred and refluxed for four hours. The solvent was removed on a steam bath with an air jet, and the residue taken up in ethyl ether and washed three times with dilute aqueous sodium chloride. The ether solution was dried over anhydrous magnesium sulfate, filtered and the ether removed on the steam bath with an air jet. The viscous product weighed 170 g. (90% of theory). $n_D^{30} = 1.5468$.

| Analysis | Sulfur, percent | Nitrogen, percent | Phosphorus, percent |
|---|---|---|---|
| Theory | 26.00 | 3.79 | 8.39 |
| Found | 25.69 | 3.88 | 7.69 |

*Example 2.—N-(beta-O,)-diisopropyldithiophosphoryl)-benzene sulfonamide*

By an analogous procedure as for Example 1, a mixture of 13.2 g. (0.06 M) of N-(beta-chloroethyl)-benzenesulfonamide, 25.2 g. (0.1 M) of potassium-diisopropyl dithiophosphate and 100 ml. of methyl ethyl ketone yielded after a four hour reflux period, 20.8 g. (88% of theory) of viscous product. $n_D^{30} = 1.5428$.

| Analysis | Sulfur percent | Nitrogen, percent | Phosphorus, percent |
|---|---|---|---|
| Theory | 24.15 | 3.54 | 7.79 |
| Found | 25.42 | 3.60 | 6.72 |

By analogous procedures the following additional compounds were prepared:

| # | Aryl | $R_1$ and $R_2$ | $n_D^{30}$ |
|---|---|---|---|
| 3 | Phenyl | n-Butyl | 1.5377 |
| 4 | p-Toluyl | Ethyl | 1.5496 |
| 5 | do | Isopropyl | 1.5411 |
| 6 | p-Chlorophenyl | Ethyl | 1.5661 |
| 7 | 3,4-dichlorophenyl | do | 1.5729 |
| 8 | do | Isopropyl | 1.5590 |
| 9 | 2,5-dichlorophenyl | Ethyl | 1.5685 |
| 10 | do | Isopropyl | 1.5595 |
| 11 | 2,5-dimethylphenyl | Ethyl | 1.5563 |
| 12 | do | Isopropyl | 1.5423 |
| 13 | m-Nitrophenyl | Ethyl | 1.5708 |
| 14 | do | Isopropyl | 1.5501 |
| 15 | Phenyl | n-Propyl | 1.5445 |
| 16 | 2,5-dichlorophenyl | do | 1.5583 |
| 17 | Phenyl | Ethyl-isopropyl | |
| 18 | do | Methyl-isopropyl | |
| 19 | do | Ethyl-n-propyl | |
| 20 | do | Methyl-ethyl | |

The compounds of the present invention are excellent herbicides as will be indicated by the test results shown hereinafter wherein the compounds of the present invention are used as pre-emergence herbicides.

In making the tests for pre-emergence application, seeds of the test weed species are planted in individual rows one-half inch deep in Santa Cruz sandy loam soil contained in 8″ x 12″ metal flats. Enough seeds are planted to give about 30 to 50 plants of each weed species in each flat. The flats are watered after planting and the following day each flat is sprayed at a rate of 5 pounds of the compound under test in 80 gallons of solution per acre. The spraying is conducted as the flat is carried by a moving belt under a sprayer to simulate field spraying conditions. Two weeks later the degree of weed control is determined by comparing the amount of germination and growth of each weed in the treated flats with the weeds in several untreated control flats.

The following chart shows the results of such tests.

| Compound | Foxtail | | Annual Bluegrass | | Crab grass | | Nut grass | |
|---|---|---|---|---|---|---|---|---|
| | Ge | Gr | Ge | Gr | Ge | Gr | Ge | Gr |
| | *Percent* | | *Percent* | | *Percent* | | *Percent* | |
| 1 | 50 | 1m1 | 100 | 1m1 | 0 | | 0 | |
| 2 | 50 | 1m1 | 100 | 2m1 | 0 | | 25 | 1ch1 |
| 3 | 100 | 5m5 | 100 | 7 | 50 | 2m2 | | |
| 5 | 50 | 3m3 | 100 | 10 | 50 | 2m2 | | |
| 6 | 100 | 5m5 | | | | | | |
| 7 | 100 | 5m5 | 70 | 7 | | | 100 | 10 |
| 8 | 100 | 5m5 | 100 | 10 | | | 100 | 10 |
| 10 | 100 | 10 | 100 | 10 | | | 0 | |
| 13 | 100 | 10 | 30 | 3 | | | 70 | 10 |
| 14 | 100 | 10 | 100 | 10 | | | 50 | 7 |

Legends: Ge—germination, Gr—growth (on a rating system of 0 to 10; 0=death or very severe effects, 10=normal), m—malformation, ch—chlorosis.

Compounds 15 and 16 were tested slightly differently. In these tests, seeds of Foxtail, Annual bluegrass, Water grass, and red-root pigweed were planted in individual rows one-half inch deep in Santa Cruz sandy loam soil contained in compressed paper flats 8¼" x 6½" which are 2¾" deep. Enough seeds are planted to give about thirty to fifty plants of each weed species in each flat. The flats are watered after planting and the following day each flat is sprayed at a rate of 20 pounds of the compound under test in 80 gallons of solution per acre. A No. 152 De Vilbiss atomizer is used to spray the solution on the soil surface. Two weeks later the degree of weed control is determined by comparing the amount of germination and growth of each weed in the treated flats with the weeds in several control flats.

The results of these tests are as follows:

| Compound | Foxtail | | Annual Bluegrass | | Water grass | | Pigweed | |
|---|---|---|---|---|---|---|---|---|
| | Ge | Gr | Ge | Gr | Ge | Gr | Ge | Gr |
| | *Percent* | | *Percent* | | *Percent* | | *Percent* | |
| 15 | 0 | | 0 | | 20 | 2d2 | 0 | |
| 16 | 50 | 5 | 20 | 2b2 | 50 | 5 | 20 | 2b2 |

Legends: Ge—germination, Gr—growth (on a 0 to 10 scale; 0=death or very severe effect, 10=normal), b—burn, d—desiccation.

Compounds 17 through 20 were tested in the same manner as were compounds 15 and 16. The test rate, however, was 2 lbs./acre and the weed species tested were crab grass, foxtail and water grass. The results were as follows:

| Compound | Crab grass | | Foxtail | | Water grass | |
|---|---|---|---|---|---|---|
| | Ge | Gr | Ge | Gr | Ge | Gr |
| | *Percent* | | *Percent* | | *Percent* | |
| 17 | 0 | | 0 | | 0 | |
| 18 | 0 | | 0 | | 0 | |
| 19 | 100 | 2 | 100 | 2 | 100 | 3 |
| 20 | 100 | 3 | 100 | 5 | 100 | 3 |

Legends: Ge—germination, Gr—growth (on a rating system of 0 to 10; 0=death or very severe effects, 10=normal).

We claim:
1. A compound of the formula:

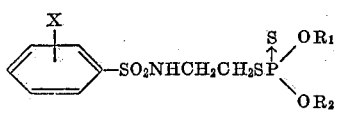

wherein $R_1$ and $R_2$ are lower alkyl and X is selected from the group consisting of hydrogen, chlorine, lower alkyl and nitro.

2. A compound of the formula:

$$RSO_2NHCH_2CH_2S\overset{S}{\overset{\uparrow}{P}}\diagup^{OR_1}_{OR_2}$$

wherein $R_1$ and $R_2$ are lower alkyl and R is selected from the group consisting of phenyl, p-tolyl, p-chlorophenyl, 3,4-dichlorophenyl, 2,5-dimethylphenyl, m-nitrophenyl, and 2,5-dichlorophenyl.

3. A compound of the formula:

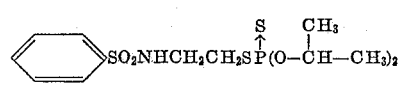

4. A compound of the formula:

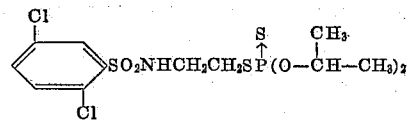

5. A compound of the formula:

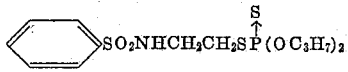

6. A compound of the formula:

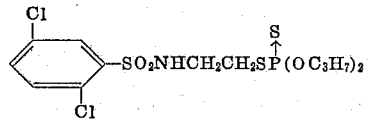

7. A compound of the formula:

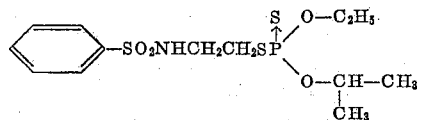

8. A compound of the formula:

$$\bigcirc\text{—}SO_2NHCH_2CH_2S\overset{S}{\overset{\uparrow}{P}}\diagup^{O—C_2H_5}_{O—CH—CH_3}_{|\ CH_3}$$

9. A compound of the formula:
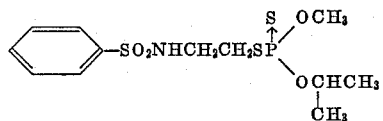
10. A compound of the formula:
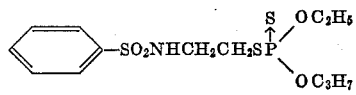
11. A compound of the formula:
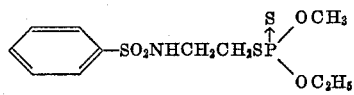
References Cited by the Examiner
UNITED STATES PATENTS
| | | | |
|---|---|---|---|
| 2,705,195 | 3/55 | Cupery et al. | 71—2.6 |
| 2,744,819 | 5/56 | Toornman | 71—2.6 |
| 2,803,580 | 8/57 | Metivier | 260—461 |
| 2,862,019 | 11/58 | Schrader | 260—461 |
| 2,865,801 | 12/58 | Baker et al. | 260—461 X |
| 2,894,017 | 7/59 | Schegk et al. | 260—461 |
| 3,005,004 | 10/61 | Berkelhammer | 260—461 |
FOREIGN PATENTS
927,092   4/55   Germany.
CHARLES B. PARKER, *Primary Examiner.*
IRVING MARCUS, *Examiner.*